(12) United States Patent
Harris et al.

(10) Patent No.: US 10,416,773 B2
(45) Date of Patent: Sep. 17, 2019

(54) TOUCH SENSITIVE DEVICE

(71) Applicant: NVF Tech Ltd., Cambridgeshire (GB)

(72) Inventors: Neil John Harris, Cambridgeshire (GB); Martin Colloms, Cambridgeshire (GB)

(73) Assignee: NVF Tech Ltd, Cambridgeshire (GB)

( * ) Notice: Subject to any disclaimer, the term of this patent is extended or adjusted under 35 U.S.C. 154(b) by 4 days.

(21) Appl. No.: 15/853,383

(22) Filed: Dec. 22, 2017

(65) Prior Publication Data

US 2018/0196519 A1    Jul. 12, 2018

Related U.S. Application Data

(63) Continuation of application No. 13/258,952, filed as application No. PCT/GB2010/050578 on Apr. 1, 2010, now abandoned.

(30) Foreign Application Priority Data

Apr. 2, 2009  (GB) .................................. 0905692.0

(51) Int. Cl.
*G06F 3/01* (2006.01)
*G06F 3/043* (2006.01)

(52) U.S. Cl.
CPC ............ *G06F 3/016* (2013.01); *G06F 3/0436* (2013.01)

(58) Field of Classification Search
CPC .............................. G06F 3/0436; G06F 3/016
See application file for complete search history.

(56) References Cited

U.S. PATENT DOCUMENTS 4,885,565 A    12/1989  Embach
5,466,985 A    11/1995  Suzuki
(Continued)

FOREIGN PATENT DOCUMENTS

WO    WO 1997/09842    3/1997
WO    WO 1997/09859    3/1997
(Continued)

OTHER PUBLICATIONS

International Preliminary Report on Patentability, issued in International Application No. PCT/GB2010/050578, dated Oct. 4, 2011, 6 pages.
(Continued)

*Primary Examiner* — Benyam Ketema
(74) *Attorney, Agent, or Firm* — Fish & Richardson P.C.

(57) ABSTRACT

A touch sensitive device comprising a touch surface, a force exciter coupled to the touch surface to excite vibration in the surface in response to a signal sent to the exciter, with the touch surface and exciter together forming a coupled system and a signal generator to generate the signal, with the signal generator generating a carrier wave signal at frequencies within the frequency bandwidth of the coupled system and modulating the carrier wave signal with a complex modulation where the modulated carrier wave signal has a time response comparable to that of a low frequency signal which produces a desired haptic sensation whereby a user touching the touch surface excited by the exciter in response to the modulated carrier wave signal experiences the desired haptic sensation which is perceived at a frequency below the frequency bandwidth of the coupled system.

18 Claims, 5 Drawing Sheets

(56) References Cited

U.S. PATENT DOCUMENTS

| | | | |
|---|---|---|---|
| 5,638,060 A | 6/1997 | Kataoka et al. | |
| 5,673,041 A | 9/1997 | Chatigny | |
| 5,977,867 A | 11/1999 | Blouin | |
| 6,091,406 A | 7/2000 | Kambara | |
| 6,192,136 B1* | 2/2001 | Azima | B42D 15/022 |
| | | | 381/338 |
| 6,310,605 B1* | 10/2001 | Rosenberg | G06F 3/011 |
| | | | 345/157 |
| 7,924,144 B2 | 4/2011 | Makinen et al. | |
| 9,001,060 B2* | 4/2015 | Harris | G06F 3/016 |
| | | | 345/173 |
| 2001/0006006 A1* | 7/2001 | Hill | G06F 3/0433 |
| | | | 73/606 |
| 2002/0075135 A1 | 6/2002 | Bown | |
| 2002/0135570 A1* | 9/2002 | Iisaka | G06F 1/1626 |
| | | | 345/177 |
| 2005/0134561 A1 | 6/2005 | Tierling et al. | |
| 2007/0080951 A1* | 4/2007 | Maruyama | G06F 1/1626 |
| | | | 345/173 |
| 2007/0285216 A1* | 12/2007 | Tierling | A63F 13/06 |
| | | | 340/407.1 |
| 2008/0055277 A1* | 3/2008 | Takenaka | G06F 3/016 |
| | | | 345/177 |
| 2008/0100177 A1* | 5/2008 | Dai | G06F 3/016 |
| | | | 310/317 |
| 2010/0250071 A1* | 9/2010 | Pala | B60K 35/00 |
| | | | 701/48 |
| 2012/0200520 A1 | 8/2012 | Harris | |
| 2014/0267065 A1* | 9/2014 | Levesque | G06F 3/016 |
| | | | 345/173 |

FOREIGN PATENT DOCUMENTS

| | | |
|---|---|---|
| WO | WO 1998/34320 | 8/1998 |
| WO | WO 1999/13687 | 3/1999 |
| WO | WO 2000/13464 | 3/2000 |
| WO | WO 2001/48684 | 7/2001 |
| WO | WO 2001/54450 | 7/2001 |
| WO | WO 2003/005292 | 1/2003 |
| WO | 03/012558 | 2/2003 |
| WO | WO 2004/053781 | 6/2004 |

OTHER PUBLICATIONS

International Search Report issued in International Application No. PCT/GB2010/050578, dated Nov. 24, 2010, 3 pages.

Written Opinion issued in International Application No. PCT/GB2010/050578, dated Oct. 2, 2011, 5 pages.

* cited by examiner

TOUCH SENSITIVE DEVICE

TECHNICAL FIELD

The invention relates to touch sensitive devices including touch sensitive screens or panels.

BACKGROUND ART

U.S. Pat. Nos. 4,885,565, 5,638,060, 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which form a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and duration of the mechanical vibrations are controlled, with the duration being long enough to be felt but short enough to terminate before the next key touch. US2002/0075135 describes the use of a second transducer to provide vibration in the form of transient to simulate a button click.

In each of the prior art documents described above, tactile feedback is provided in response to a discrete touch, of a user's finger or pointer.

DISCLOSURE OF INVENTION

According to the invention, there is provided a method of generating a desired haptic sensation in a coupled system comprising a touch surface and a force exciter or actuator coupled to the touch surface, the method comprising
  generating a carrier wave signal at frequencies within the frequency bandwidth of the coupled system,
  modulating the carrier wave signal with a complex modulation where the modulated carrier wave signal has a time response comparable to that of a low frequency signal which produces the desired haptic sensation and
  driving the exciter or actuator with the modulated carrier wave signal to excite the touch surface whereby the desired haptic sensation is perceived at a frequency below the frequency bandwidth of the coupled system is simulated to a user touching the touch surface.

The present applicant has recognised that by matching the time response of the modulated carrier wave signal with the time response of a signal which produces the desired haptic sensation, when a user touches a surface excited by the modulated signal, the user will demodulate the higher frequency modulated signal into the required haptic response which would be generated but the usual low frequency stimulus. A user has two categories of sensor. One category is slowly adapting and detects constant stimuli (e.g. pressure & skin stretch). The other category is rapidly adapting and detects only short pulses (e.g. initial contact & vibration). The invention extrapolates from the known auditory psychoacoustic behaviour in which a user perceives frequencies below those which are actually being generated by the system to suggest that there is a comparable touch response in which a user senses the presence of frequencies below those which are actually being generated by a mechanical system. Thus, the coupled mechanical system may be able to simulate a desired haptic sensation at ultra-low frequencies, e.g. in the range of 10 to 40 Hz. It would not be possible to directly generate such low frequencies since they are significantly below the frequency range of the coupled system itself.

In common with all sensory nerve pathways, the nerve cells for touch produce pulses sent to the brain at a rate that is related to the strength of the stimulation. The probability of a nerve firing is proportional to the number of pulses received. These nerve firings are integrated within the nervous system by the equivalent of a leaky integrator to produce a perceived level proportional to the subjective strength of the stimulation.

The touch system may be considered as an analogue of an electrical system in which neural firing generates pulses which may correspond to a "soft rectifier" model, $$p(t) = p_0 \left( \frac{1}{2} h(t) + \sqrt{\frac{1}{4} h(t)^2 + 1} \right)$$

or $$p(t) = p_0 \sqrt{h(t)^2 + 1}$$

The filter h(t) represents the frequency selectivity of the neurons and is scaled relative to the threshold of feeling (in the corresponding psychoacoustical model the scaling is such that a signal at 30 dB above threshold gives a amplitude of 1). The constant $p_0$ is the scaling factor from strength of excitation to pulse rate. The sensation experienced by a user is then related to the output of a low-pass filtering (or leaky integration) of this firing. In other words, the user demodulates the sensed signal to extract the designed complex modulation information in the signal, including the time envelope (for example the duration of the modulation on a higher frequency carrier wave signal).

The demodulation (i.e. information extraction from the carrier) by the user may have the following steps. Firstly, nerve endings generate pulses at a rate related to the pressure applied, i.e. force generated by the vibration (rectification process). Then the pulses are "binned", i.e. counted over fixed time windows (integration process). If the count exceeds a given threshold (the threshold of sensitivity), the neuron fires, with the strength of sensation being determined by the number of neurons firing. In other words, in the analogous electrical system, a user effectively acts as a rectifier, e.g. a full-wave rectifier which converts the received vibration signals from the surface to one of constant polarity. The rectified signal is then passed to a low-pass filter so that low-frequency signals pass through but signals with higher frequencies than the filter cutoff frequency are attenuated.

The complex modulation of the carrier permits an increased haptic response to be perceived by the user in the low frequency range with more efficient operation of the coupled system in the higher frequency range, as compared to that obtained using a simple tone-like signal. It also permits the usage of the available bandwidth of the coupled haptic system to be maximised. Complex modulation comprises methods such as pulse width or pulse rate modulation, frequency modulation, multiple frequency modulation and phase modulation or combinations of these techniques to achieve a target functional response for the user.

According to another aspect of the invention, there is provided a touch sensitive device comprising a touch surface, a force exciter coupled to the touch surface to excite vibration in the surface in response to a signal sent to the exciter, with the touch surface and exciter together forming a coupled system and a signal generator to generate the signal, with the signal generator generating a carrier wave signal at frequencies within the frequency bandwidth of the coupled system and modulating the carrier wave signal with a complex modulation where the modulated carrier wave signal has a time response comparable to that of a low frequency signal which produces a desired haptic sensation whereby a user touching the touch surface excited by the exciter in response to the modulated carrier wave signal experiences the desired haptic sensation which is perceived at a frequency below the frequency bandwidth of the coupled system.

The haptic sensation may provide the sensation of a button click to a user. Alternatively, a complex haptic signal (in terms of produced displacement and/or acceleration) may be generated to provide additional information to the user. The haptic feedback signal may be associated with a user action or gesture etc. Alternatively, or additional, the haptic signal may be associated with the response of the surface in terms of display action or reaction.

The carrier wave signal may be a gated sine wave at a single frequency. Alternatively, the carrier wave signal may comprise multiple sine waves covering a range of frequencies, may be a swept (FM modulated) sine wave or a band-limited noise signal. Other modulation methods may be used to generate the required, sensed low frequency haptic stimulation.

The generated carrier wave signal may contain information at frequencies which are harmonically related to the frequencies in the signal which generates the desired haptic sensation, whereby the haptic sensation is improved. This follows the well known psychoacoustic phenomenon called pitch recognition, in which reconstruction of the fundamental from the harmonic series allows for the perception of lower frequencies that are actually absent from the stimulus.

The surface may be vibrated by applying a signal comprising multiple pulses or a stream of pulses. The pulse stream may itself be coded with more complex sub pulse trains.

The modulation may comprise differing superimposed pulse trains, which may be of differing amplitudes.

The vibration may include any type of vibration, including bending wave vibration, and including resonant bending wave vibration.

The vibration exciter may comprise means for applying a bending wave vibration to the screen face. The vibration exciter may be electro-mechanical. The exciter may provide excitation for a frequency bandwidth for the coupled system in the region of 100 Hz to 400 Hz. The actuator may have a high Bl or force factor. BL may have a value greater than 3 or greater than 5. Bl is defined in a standard electromagnetic exciter as the product of magnet field strength in the voice coil gap and the length of wire in the magnetic field, in tesla-meters (T·m).

The exciter may be an electromagnetic exciter and may have a frequency bandwidth for the coupled system of 150 Hz to 300 Hz. Such exciters are well known in the art e.g. from WO97/09859, WO98/34320 and WO99/13684, belonging to the applicant and incorporated herein by reference. Alternatively, the exciter may be a piezoelectric transducer, a magneto-strictive exciter or a bender or torsional transducer (e.g. of the type taught in WO 00/13464). The piezoelectric transducer may have a frequency bandwidth for the coupled system with a lower limit in the region of 100 Hz to 350 Hz. The exciter may be a distributed mode actuator, as described in WO01/54450, incorporated herein by reference and may have a frequency bandwidth for the coupled system of 150 Hz to 350 Hz. A plurality of exciters (perhaps of different types) may be selected to operate in a co-ordinated fashion. The or each exciter may be inertial.

The touch surface may be a panel-form member which is a bending wave device, for example, a resonant bending wave device. The touch screen may also be a loudspeaker wherein a second vibration exciter excites vibration which produces an acoustic output. For example, the touch screen may be a resonant bending wave mode loudspeaker as described in International Patent Application WO97/09842 which is incorporated by reference.

Contact on the touch surface may be detected and/or tracked as described in International patent applications WO 01/48684, WO 03/005292 and/or WO 04/053781 to the present applicant. These International patent applications are incorporated herein by reference. Alternatively, other known methods may be used to receive and record or sense such contacts. For example, indirect sensing methods such as proximity capacitive sensing and optical sensing may be used. Thus, the touch surface may use direct or indirect sensing methods and may be termed a touch-sensitive surface.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

BRIEF DESCRIPTION OF DRAWINGS

The invention is diagrammatically illustrated, by way of example, in the accompanying drawings in which: —

FIG. 1b is a block diagram of the system for use with the touch screen of FIG. 1a;

DETAILED DESCRIPTION OF DRAWINGS

Figure 1A:
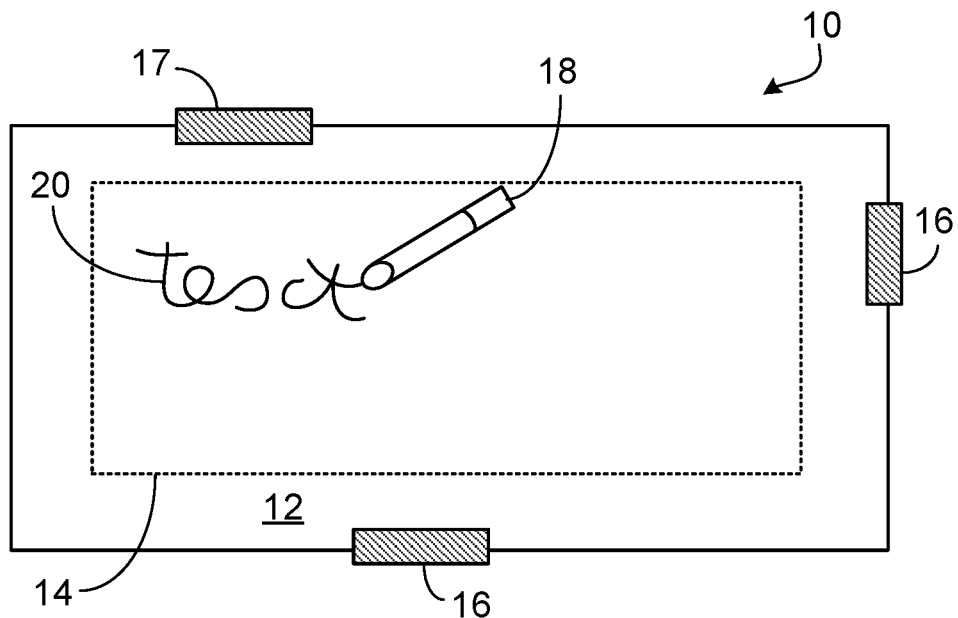
FIG. 1a is a plan view of a touch screen.

FIG. 1a shows a touch sensitive device 10 comprising a touch screen 12 which is being contacted by a user's finger. One or more sensors 17 are used to detect a touch or movement on the screen and an exciter 16 is provided to generate a signal within the screen.

Figure 1B:
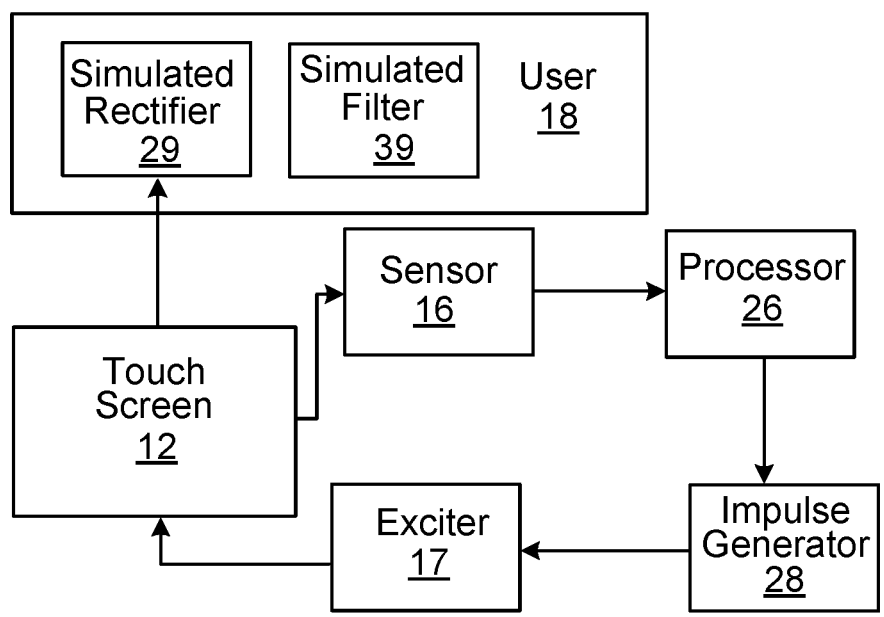

FIG. 1b shows how the touch sensitive device 10 may be adapted to use haptic methods and mechanical feedback technology to create touch-related feedback to a user. The screen surface is mechanically energised by the exciter in response to a user's touch. As shown in FIG. 1b, the touch screen 12 is connected to a sensor 17 which detects the nature of the contact. The sensor is connected to a processor 26 which processes the signals from the sensor which instructs the modulated generator 28 to generate a signal. The signal is passed to a user 18 and the neural responses of a user effectively provide a rectifier 29 and a filter 30 as described in more detail below. The filter 30 reduces any high-frequency breakthrough from the impulse generator.

Figure 2A:
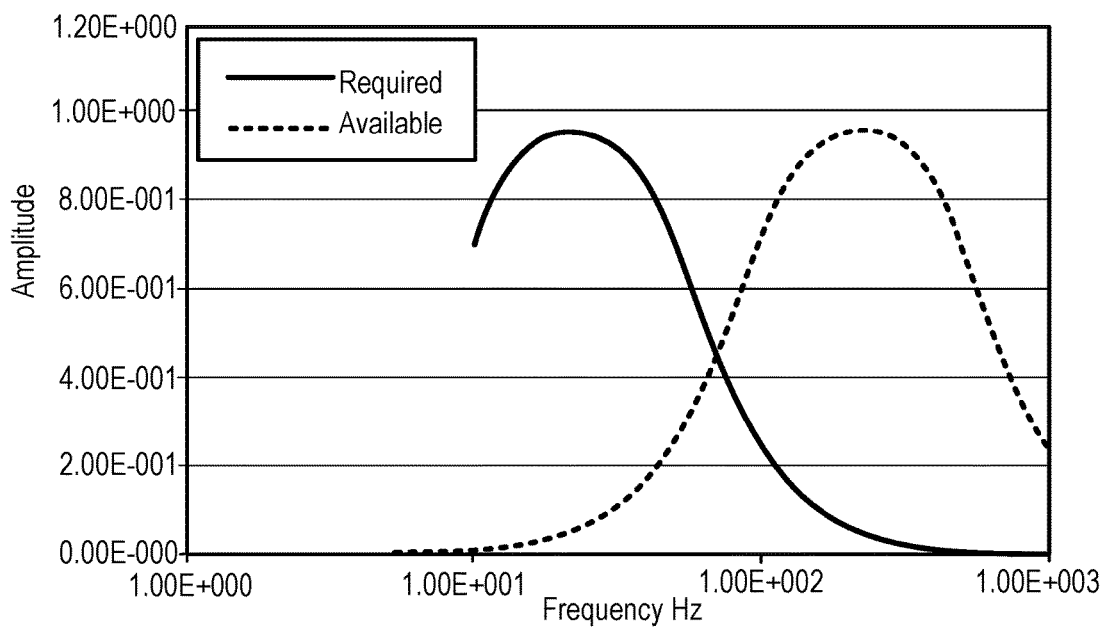
FIG. 2a is a graph showing the frequency spectra (amplitude varying with frequency) for the signal producing the required sensation and the available force from the current signal.

FIG. 2a shows the frequency spectra (variation in amplitude with frequency) for a signal generated by the system without modulation or filtering. The signal generated by the exciter has an amplitude which peaks at approximately 225 Hz and is at 80% of this maximum from approximately 150 Hz to 350 Hz. In contrast, the required sensation has a peak at approximately 25 Hz and is above 80% from approximately 15 Hz to 35 Hz. Both spectra have a similar shape and are in proportion with each other. However, the required sensation has a significantly lowered frequency, i.e. an ultra low frequency and is lowered by an order of magnitude when compared to the signal generated by the exciter.

Figure 2B:
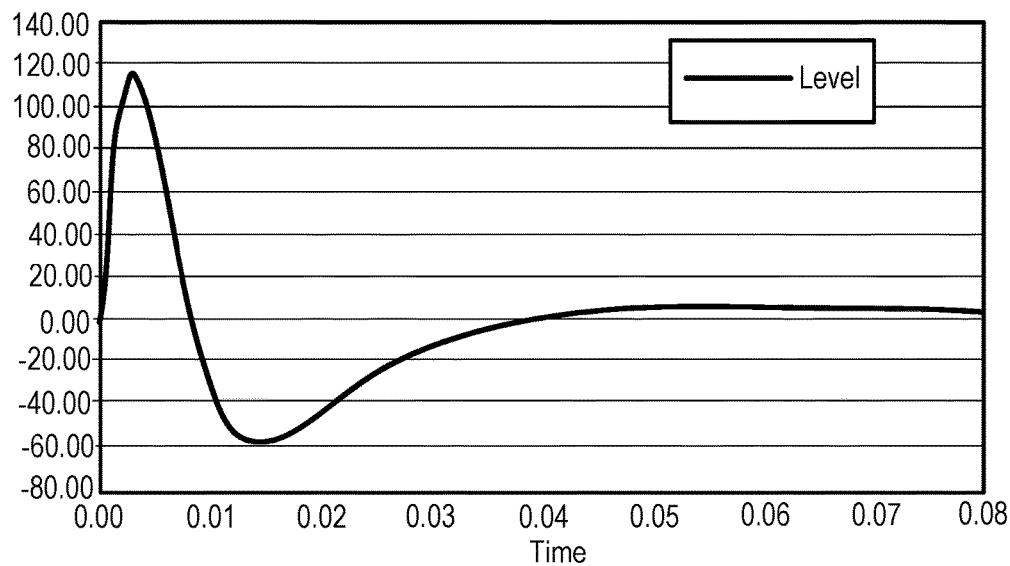
FIG. 2b is the time domain spectrum for the required sensation.

FIG. 2b shows the time domain spectrum for the required sensation shown in FIG. 2a. The pulse width is less than 200 ms, more particularly approximately 100 ms.

Figure 2C:
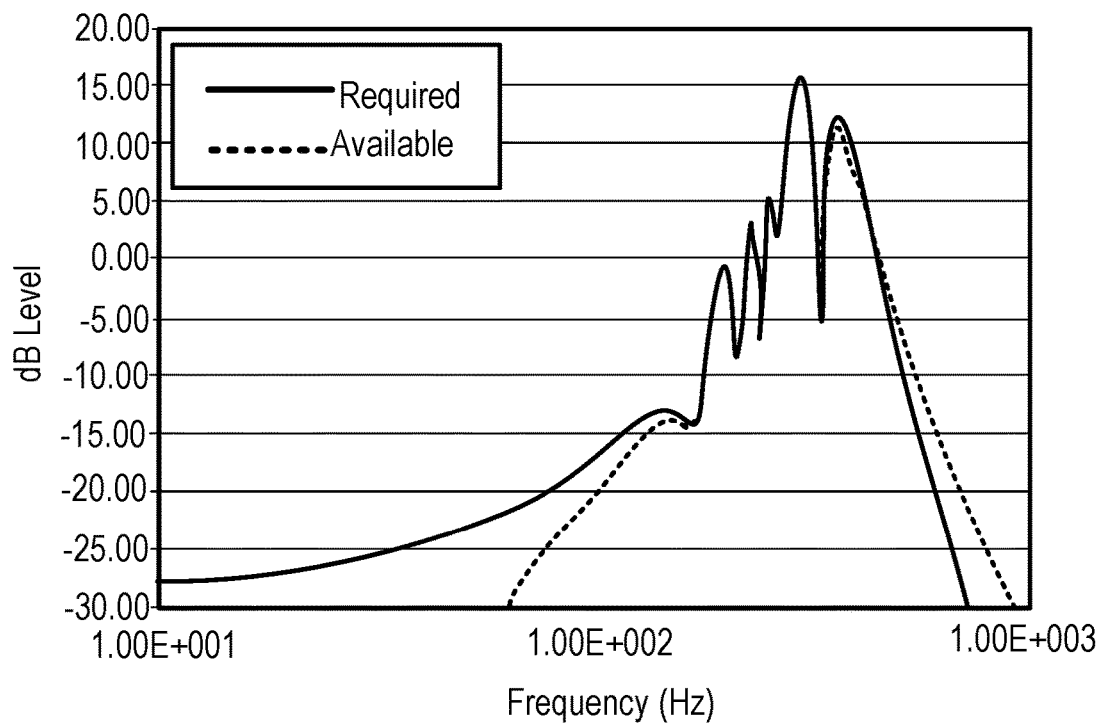
FIG. 2c is the generated signal and force spectra for the current signal showing variation in output (dB) against frequency.

FIG. 2c shows more detail of an example signal used by the system, namely a linearly swept sine-wave which reduces in frequency from 350 Hz to 100 Hz over a 100 ms period. As shown in FIG. 2c most of the electrical signal is reproduced as a resulting force.

Figure 2D:
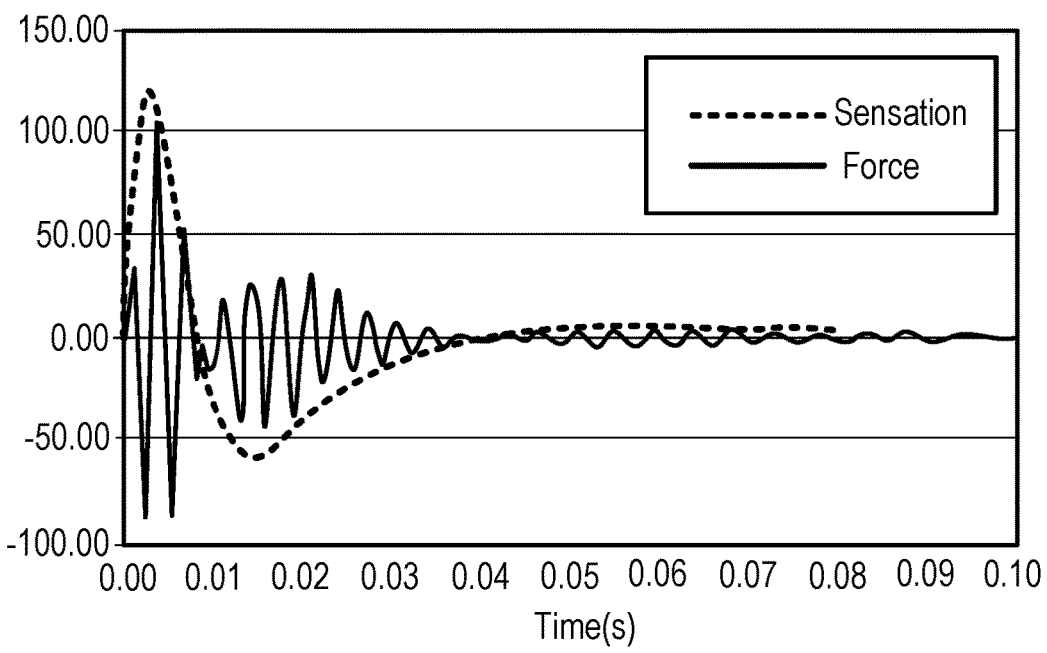
FIG. 2d is the time domain spectra for the required sensation and the force generated by the signal of FIG. 2c.

FIG. 2d compares the time domain spectra for the signal of FIG. 2c with that shown in FIG. 2b. In the time domain, the signal produced by the modulated generator provides an oscillatory force but there is a good match between the envelope of the two signals, i.e. both signals decay to approximately zero within the same time period of approximately 350 ms.

Figure 2E:
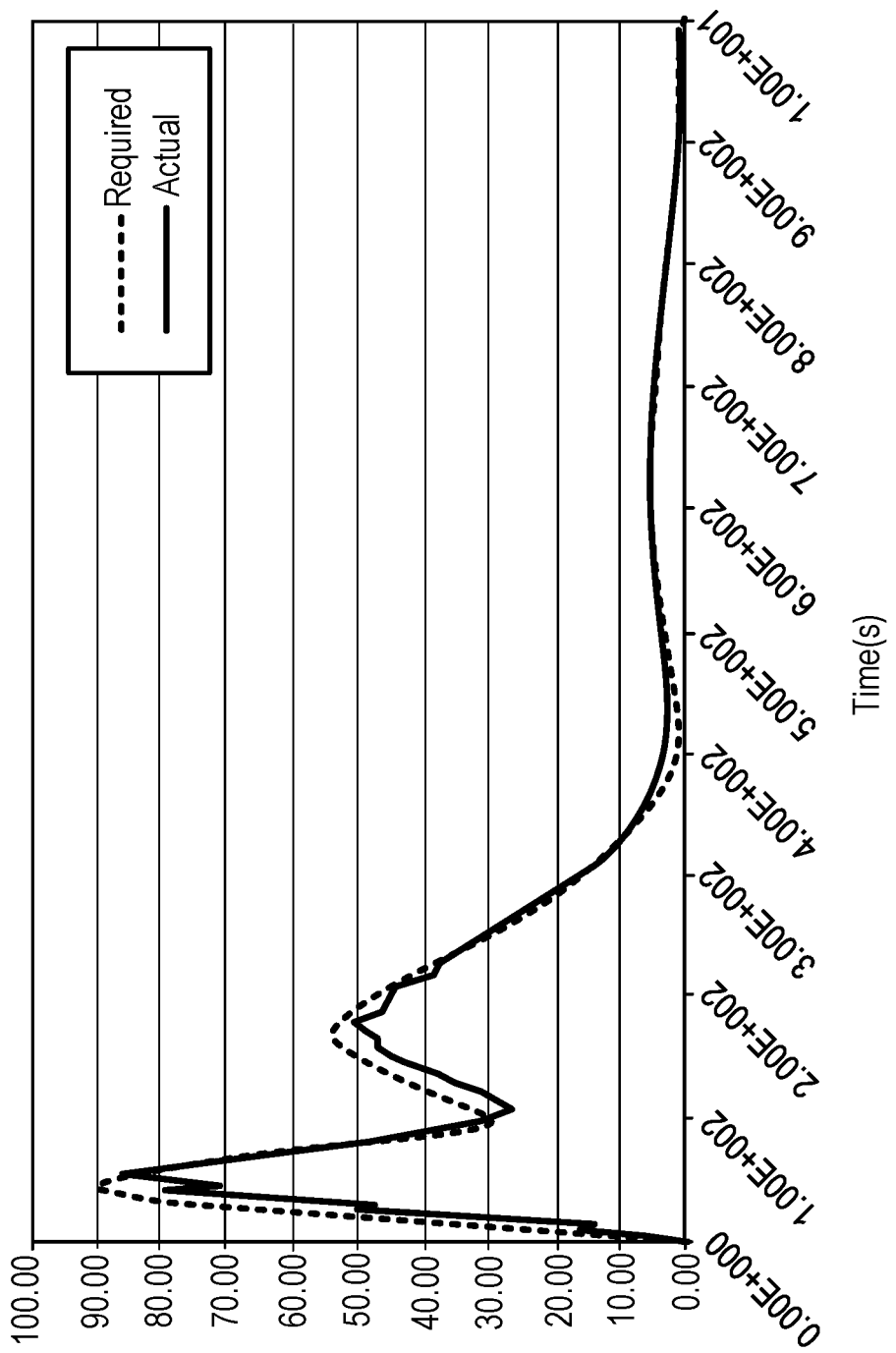
FIG. 2e is the detected output for the required signal and the actual signal as it varies with time.

FIG. 2e illustrates the user demodulated results of the signal from the impulse generator. When received by a user the signal generated at the touch-sensitive surface is effectively passed through a full-wave rectifier so that the whole of the input waveform is converted to a single (positive) polarity at its output. This rectified signal is then effectively passed through a low-pass filter so that low-frequency signals pass through but signals with higher frequencies than the cut-off frequency are attenuated. The actual amount of attenuation for each frequency varies from user to user. The cut-off frequency would be around, say, 100 Hz. The sensation created by the modulated signal is a useful match for the fundamental signal which would produce the desired sensation.

Figure 3:
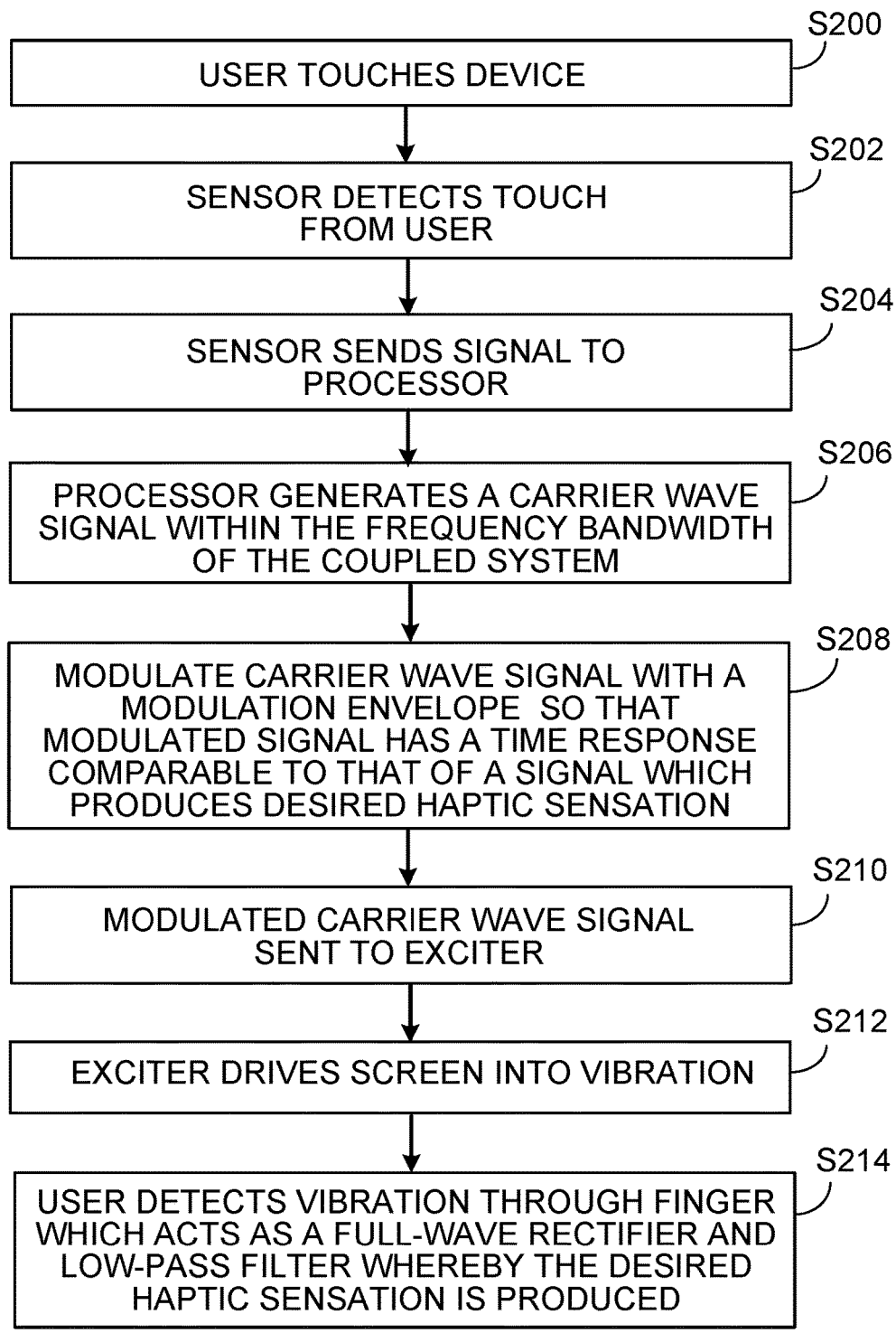
FIG. 3 is a flow chart of the method.

As shown in FIG. 3, at step 200 a user touches the screen of the device and at step 202, a sensor mounted on the screen detects this touch. On detection of the touch, the sensor sends a signal to a processor at step S204. The processor then follows steps S206 to S210 to generate an output signal for an exciter mounted to the screen. The processor generates a carrier wave signal which is within the frequency bandwidth of the coupled system and modulates the generated carrier wave signal so that the modulated carrier wave signal has a time response comparable to a signal that produces the desired haptic sensation.

The modulated signal is frequency modulated and may be supplemented with further complex modulation. The modulated signal may be in the form of a damped sinusoid. The modulated signal may be in the form:

$$h(t) = f(t)g(t)$$
$$h(t) = \alpha t e^{1-\alpha t}\cos\left(\frac{\omega c t}{1+\beta t}\right) \text{ or}$$
$$h(t) = \alpha t e^{1-\alpha t}\sin\left(\frac{\omega c t}{1+\beta t} + C\right)$$

where $\alpha$ is a decay rate of the modulation envelope f(t)
C is a constant
$\beta$ is a parameter controlling the rate of frequency modulation g(t), and
$\omega c$ is the angular frequency at time t=0.

The exciter drives the screen into vibration at step S212 and as described in reference to FIG. 2e, at step S214, the detected vibration is effectively demodulated by the user's finger.

No doubt many other effective alternatives will occur to the skilled person. For example, although the invention is described in terms of touch sensing and a touch surface, it will be appreciated that indirect sensing methods such as proximity capacitive sensing and optical sensing are also intended to be encompassed within the scope of the claims.

It will be understood that the invention is not limited to the described embodiments and encompasses modifications apparent to those skilled in the art lying within the spirit and scope of the claims appended hereto.

The invention claimed is:

1. A method comprising:
   detecting a user's touch of a touch surface of a display panel, the display panel coupled to an actuator, wherein the actuator and display panel define a coupled system; and
   in response to the detecting, driving the actuator to provide an excitation of the coupled system with a carrier wave signal at a frequency in a range from 100 Hz to 400 Hz, wherein driving the actuator comprises modulating an amplitude and/or the frequency of the carrier wave signal to provide a modulated signal, the modulated signal having a modulation envelope that has a modulation frequency between 10 Hz and 40 Hz, wherein the actuator is driven while the user touches the display panel to provide a haptic sensation to the user comprising a vibration at the modulation frequency.

2. The method of claim 1, wherein the actuator comprises a distributed mode actuator and the frequency range of the coupled system is between 150 Hz to 350 Hz.

3. The method of claim 1, wherein the actuator comprises a piezoelectric actuator and the frequency range of the coupled system is between 100 Hz to 300 Hz.

4. The method of claim 1, wherein the actuator comprises an electromagnetic actuator and the frequency range of the coupled system is between 150 Hz to 300 Hz.

5. The method of claim 1, wherein modulating the amplitude and/or frequency of the carrier wave signal comprises phase modulation.

6. The method of claim 1, wherein modulating the amplitude and/or frequency of the carrier wave signal comprises pulse width modulation.

7. The method of claim 1, wherein modulating the amplitude and/or frequency of the carrier wave signal comprises pulse rate modulation.

8. The method of claim 1, wherein modulating the amplitude and/or frequency of the carrier wave signal comprises superimposing a plurality of carrier wave signal pulse trains of different amplitudes, phases and/or frequencies.

9. A device, comprising:
a coupled system comprising:
  a display panel comprising a touch surface; and
  an actuator coupled to the display panel; and
  a sensor configured to detect a user's touch of the touch surface of the display panel; and
  an impulse generator,
  wherein, in response to detecting the user's touch, the impulse generator is configured to drive the actuator with a carrier wave signal at a frequency in a range from 100 Hz to 400 Hz, wherein the driving comprises modulating an amplitude and/or the frequency of the carrier wave signal to provide a modulated signal, the modulated signal having a modulation envelope that has a modulation frequency between 10 Hz and 40 Hz, the modulation envelope comprising a pulse that includes a pair of extrema separated by a time interval corresponding to cycle of the modulation frequency,
  wherein the actuator is driven while the user touches the display panel to provide a haptic sensation to the user comprising a vibration at the modulation frequency.

10. The device of claim 9, wherein the actuator comprises a distributed mode actuator and the frequency range of the coupled system is between 150 Hz to 350 Hz.

11. The device of claim 9, wherein the actuator comprises a piezoelectric actuator and the frequency range of the coupled system is between 100 Hz to 300 Hz.

12. The device of claim 9, wherein the actuator comprises an electromagnetic actuator and the frequency range of the coupled system is between 150 Hz to 300 Hz.

13. The device of claim 9, wherein modulating the amplitude and/or frequency of the carrier wave signal comprises phase modulation.

14. The device of claim 9, wherein modulating the amplitude and/or frequency of the carrier wave signal comprises pulse width modulation.

15. The device of claim 9, wherein modulating the amplitude and/or frequency of the carrier wave signal comprises pulse rate modulation.

16. The device of claim 9, wherein modulating the amplitude and/or frequency of the carrier wave signal comprises superimposing a plurality of carrier wave signal pulse trains of different amplitudes, phases and/or frequencies.

17. The method of claim 1, wherein the actuator is driven while the user touches the display panel to transfer a force to the display panel, where a time domain spectrum of the transferred force comprises a pulse having a pair of peaks separated by a time period greater than a period of the carrier wave signal to provide the haptic sensation.

18. The device of claim 9, wherein the impulse generator is configured to drive the actuator while the user touches the display panel to transfer a force to the display panel, where a time domain spectrum of the transferred force comprising a pulse having a pair of peaks separated by a time period greater than a period of the carrier wave signal to provide a haptic sensation to the user comprising a vibration at the modulation frequency.

* * * * *